United States Patent [19]

Czelen

[11] 4,343,437
[45] Aug. 10, 1982

[54] CONDIMENT GRINDER

[76] Inventor: John C. Czelen, 3411 30th St., NW., Washington, D.C. 20008

[21] Appl. No.: 85,190

[22] Filed: Oct. 22, 1979

[51] Int. Cl.³ .............................................. A47J 42/04
[52] U.S. Cl. ................................................. 241/169.1
[58] Field of Search ..................... 241/168, 169, 169.1, 241/169.2, 278 A, DIG. 27

[56] References Cited

U.S. PATENT DOCUMENTS

| | | | |
|---|---|---|---|
| 2,147,394 | 2/1939 | Austern et al. | 241/169 |
| 2,892,595 | 6/1959 | Tupper | 241/168 X |
| 3,827,641 | 8/1974 | Andersson | 241/169.1 X |

Primary Examiner—Howard N. Goldberg

[57] ABSTRACT

A hallow container of hand size with compressible sections driving a ratchet and internal grinding mechanism permitting one-hand operation to grind or crush selected condiments such as pepper or salt.

5 Claims, 7 Drawing Figures

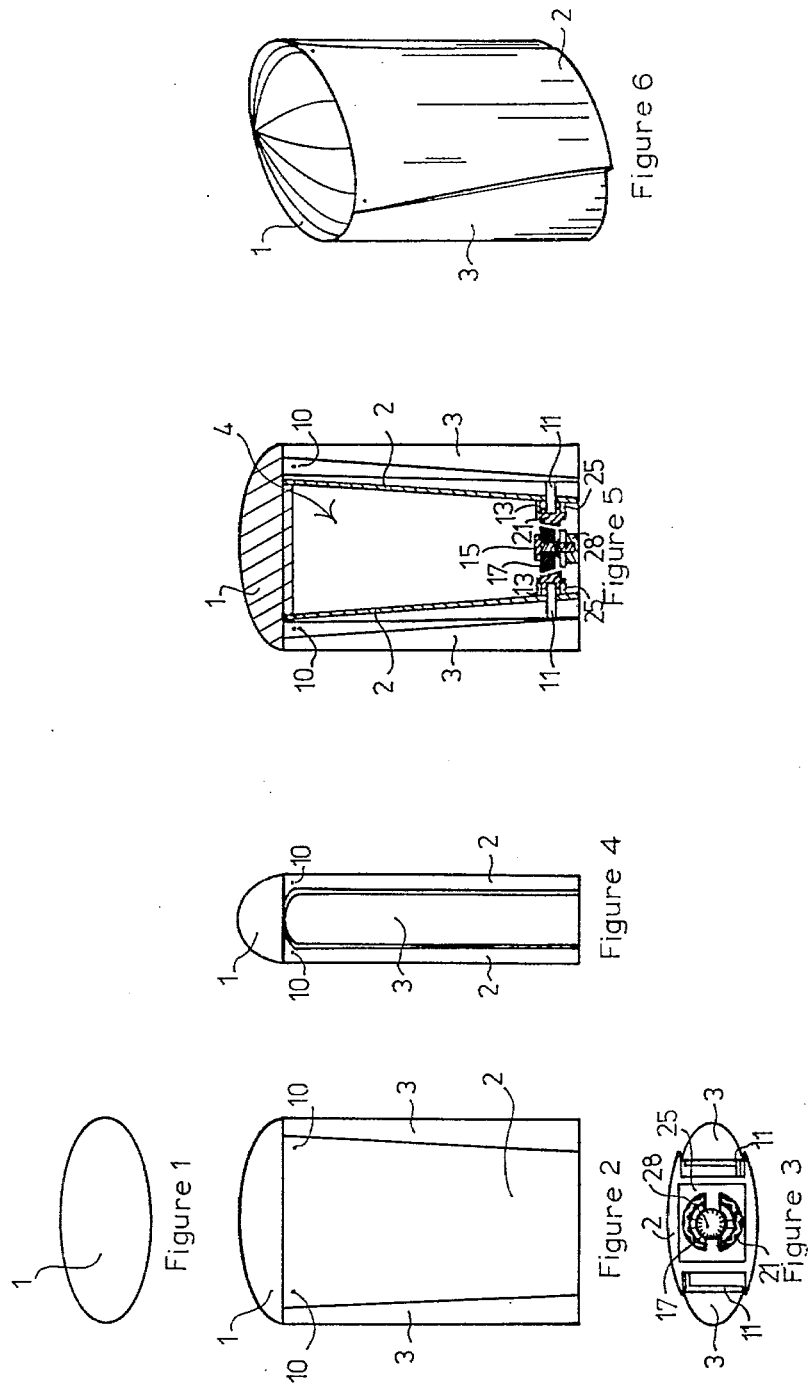

CONDIMENT GRINDER

BACKGROUND

This invention relates to condiment grinders and improvements permitting the utilization of an internal ratchet which further permits the grinding and dispensing of ground condiments with one hand.

Generally, condiments must be ground immediately prior to use to maintain freshness and flavor. Grinders to date require the use of two hands, which can be difficult to manipulate in the midst of cooking. The need exists for a design whereby a person cooking may retain the use of one hand to continue stirring or holding another utensil while the other hand dispenses the condiment. Moreover, the design should also have the capacity to be adjusted for finer or coarser grinding and incorporate alternate grinding or adjusting mechanisms.

SUMMARY

The invention provides a condiment grinder which permits one-handed operation by the compression of moveable sections that drive an internal gearing or ratchetting mechanism.

Although the invention may take many alternate forms, it should generally consist of a hand-size unit, resting comfortably in a normal person's grasp. By squeezing together or compressing spring-resistant sections of the body of the unit, an internal ratchet would drive a condiment grinding mechanism.

Although the grinding mechanism and the ratchet could be separate subassemblies, for the purpose of this application and intended ease and low cost of manufacture, the number of parts is minimized and designed to accommodate multiple functions. It should be understood that alternate gearing/ratchetting/grinding mechanisms are possible within the scope of the invention.

The invention consists of a single oval, cylindrical or rectangular unit, composed of wood, metal, plastic, or other materials. The central main body is hollow, providing a reservoir for condiments, such as pepper, salt, and so forth. The upper section of the main body is a removable cap, which can alternately be press-fit, snap-on, or screw-on type. By removing the cap, the selected condiment may be added to the reservoir.

The sides or other appropriate surface areas of the unit are moveable, generally compressible or depressible. By so moving the appropriate surface(s), an internal ratchet or gearing mechanism would be actuated. This gearing mechanism would cause the counterrotation or opposite sliding movement of grinding surfaces between which would be fed the condiment. In the description and drawing in this application, the grinding surfaces are the points of contact of a hub nested within an external ring and the condiment is gravity fed.

As part of the grinding mechanism, there should be an adjusting mechanism whereby the coarseness of the ground condiment may be varied. In this application, the coarseness can be modified by the adjustment of a knurled nut at the underside of the unit.

DRAWINGS

FIG. 1 is a top view of the grinder, viewed from above;

FIG. 2 is a front view of the grinder;

FIG. 3 is a bottom view of the grinder seen from below;

FIG. 4 is a side view;

FIG. 5 is a cut-away front view;

FIG. 6 is a 45 degree perspective rendering;

DETAILED DESCRIPTION

Figure 7:
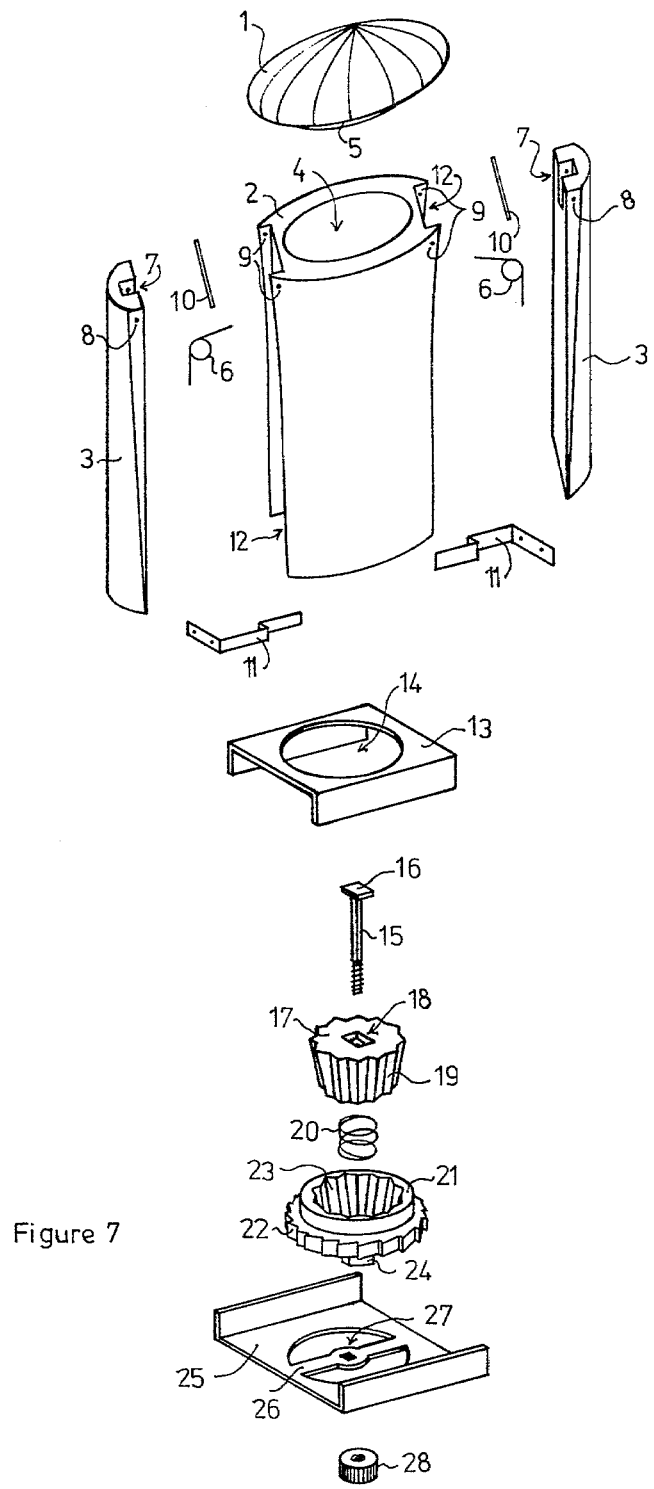
FIG. 7 is an exploded view perspective rendering of parts.

FIGS. 1, 2, 3, 4, 5, and 6 show a condiment grinder dispenser of a generally oval cylindrical shape, approximately three inches in height, two inches in width, and 1.5 inches in depth, comprised of a main body 2, a condiment reservoir 4, a cap 1, compression arms 3, and internal grinding components 13 to 28.

The main body 2 has an internal condiment reservoir 4. The internal diametric dimensions of reservoir 4 may be identical to an extension 5 on the base of the cap 1 permitting a press fit of cap 1 onto the body 2. Cap 1 can be removed and reinserted for the addition of condiments to the condiment reservoir 4.

The main body 2 has side depressions 12, which are suitable for the insertion of compression arms 3. Compression arms 3 are held to the body 2 by hinge pins 10, which are fitted through holes 8 and 9. The hinge pins 10 are tightly press fitted into holes 9 on the main body but are loosely fit into holes 8 on the compression arms permitting compression arms 3 to rotate on pins 10. Expansion springs 6 are fitted onto hinge pins 10 causing compression arms 3 to be under a rotational pressure outward from the main body 2. Compression arms 3 have internal spring grooves 7 for the nesting of expansion springs 6.

Parts 13–28 comprise the ratchet/grinding subassembly. Retaining plates 13 and 25 hold ratchet/grinding wheel 21 in a stable position permitting partial rotation along the horizontal axis. Lower retaining plate bar stop 26 retains wheel 21 in place and permits only partial rotation by striking ratchet/grinding wheel stops 24, which are a set of appendages on the lower surface of wheel 21. The external lateral surface of wheel 21 is ratchet notched surface 22 which can be engaged by ratchet arms 11.

The internal surface of wheel 21 is grinding surface 23. The dimensions of surface 23 permit the nesting of grinding hub 17. Hub 17 is held into place on plate 25 by rectangular shaft 15 which slips through the square fitted hole 18 in hub 15, through coil spring 20 and then through plate bar stop 26 with the rectangular fitted hole 27. Knurled nut 28 is internally threaded onto shaft 15. Shaft 15 and hub 17 are not free to revolve, because of their mutual keyed fitting of stop 16 in hole 18 and because of the keyed fitting of rectangular shaft 15 in hole 27. By tightening or loosening nut 28, the relative height of hub 17 to ratchet/grinding wheel 21 may be changed by the lifting force of coil spring 20.

Ratchet arms 11 are fitted to the interior flat surfaces of compression arms 3. Ratchet arms 11 make contact with the ratchet notched surface 22 of wheel 21. Upon the squeezing of compression arms 3, they in turn cause ratchet arms 11 to move toward the center of the mechanism causing ratchet/grinding wheel 21 to rotate. Condiment is fed by gravity from the reservoir 4 to the space between ratchet/grinding wheel 21 and grinding hub 17. Since grinding hub 17 remains stationary and ratchet/grinding wheel 21 revolves, the condiment is ground. Ratchet arms 11 are dog-legged and fitted through holes in the side surface of body 2. Thus, they can reach and contact wheel 21. However, the dog-leg notch prevents them from being totally withdrawn from the body 2 and likewise prevents arms 3 from rotating outwards away from body 2 due to the pressure of springs 6.

I claim:

1. A condiment grinder, adapted for one-hand operaton, comprising a hollow reservoir, having a central axis, an upper end, and an open lower end, a grinding mechanism mounted in said reservoir adjacent to said open lower end, said grinding mechanism including a grinding wheel with internal grinding surfaces and a grinding hub with external grinding surfaces, interfitting and cooperating with said internal grinding surfaces to grind the condiment therebetween upon relative movement of said hub and grinding wheel, said relative movement being achieved by means of a ratchet mechanism consisting of at least one ratchet arm, reciprocable in a direction transverse to said axis, one end of said arm engaging either said hub or said grinding wheel, the other end of said ratchet arm engaging a compression arm, movement of said compression arm causing said ratchet arm to move in a direction transverse to said central axis, and thus causing relative motion between said hub and said grinding wheel.

2. A condiment grinder as claimed in claim 1 wherein the upper end of the reservoir is provided with a sealable opening to permit access to the interior of the reservoir.

3. A condiment grinder as claimed in claim 2 wherein said sealable opening is sealed by means of a press-fit cap.

4. A condiment grinder as claimed in claim 1 wherein said grinding wheel is provided with an external ratchet gear surface adapted to cooperate with said one end of said ratchet arm, and wherein said grinding hub is non-rotatably mounted in the reservoir.

5. A condiment grinder as claimed in claim 1 wherein two ratchet arms are provided, both of which are reciprocable in a direction transverse to said axis.

* * * * *